(12) United States Patent
Seki (10) Patent No.: US 11,949,473 B2
(45) Date of Patent: Apr. 2, 2024

(54) WIRELESS RECEIVING APPARATUS, WIRELESS COMMUNICATION SYSTEM, AND WIRELESS RECEIVING METHOD

(71) Applicant: NEC Corporation, Tokyo (JP)

(72) Inventor: Katsutoshi Seki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 147 days.

(21) Appl. No.: 17/623,364

(22) PCT Filed: May 13, 2020

(86) PCT No.: PCT/JP2020/019049
§ 371 (c)(1),
(2) Date: Dec. 28, 2021

(87) PCT Pub. No.: WO2021/005881
PCT Pub. Date: Jan. 14, 2021

(65) Prior Publication Data
US 2022/0376751 A1 Nov. 24, 2022

(30) Foreign Application Priority Data
Jul. 8, 2019 (JP) ................................. 2019-126650

(51) Int. Cl.
*H04B 7/0456* (2017.01)
*H04L 25/02* (2006.01)

(52) U.S. Cl.
CPC ....... *H04B 7/0456* (2013.01); *H04L 25/0204* (2013.01)

(58) Field of Classification Search
CPC .. H04B 7/0456; H04B 7/0865; H04B 7/0842; H04L 25/0204
See application file for complete search history.

(56) References Cited

U.S. PATENT DOCUMENTS

| 2010/0197262 A1 | 8/2010 | Hosokawa et al. |
| 2014/0294125 A1 | 10/2014 | Sagae et al. |

FOREIGN PATENT DOCUMENTS

| JP | 2019-041232 A | 3/2019 |
| WO | 2008/084800 A1 | 7/2008 |
| WO | 2013/065822 A1 | 5/2013 |

OTHER PUBLICATIONS

R4-115213, NTT Docomo Reference receiver structure for interference mitigation on Enhanced performance requirement for LTE UE, Oct. 10-14, 2011. (Year: 2011).*

(Continued)

*Primary Examiner* — Sophia Vlahos (57) ABSTRACT

A receiving circuit (100) includes: a channel estimation unit (20) configured to estimate a channel response vector based on a reception signal received via a plurality of antennas (10); a covariance matrix estimation unit (30) configured to estimate a covariance matrix based on the reception signal and the channel response vector; a covariance matrix correction unit (40) configured to correct the covariance matrix by adding, to the covariance matrix, an offset value with a value in components including off-diagonal elements of the matrix; and a weight multiplication unit (50) configured to estimate a transmission signal by multiplying a weight based on the channel response vector and the corrected covariance matrix by the reception signal.

9 Claims, 7 Drawing Sheets

(56) References Cited

OTHER PUBLICATIONS

International Search Report for PCT Application No. PCT/JP2020/019049, dated Jul. 21, 2020.

Y. Ohwatari et al., "Performance of advanced receiver employing interference rejection combining to suppress inter-cell interference in LTE-Advanced downlink," In Proc. IEEE Vehi. Tech. Conf. (VTC Fall 2011), Sep. 2011, pp. 1-7.

M. K. Ozdemir et al., "Channel estimation for wireless OFDM systems," Commun. Surveys Tuts., vol. 9, No. 2, pp. 18-48, Second Quarter 2007(Jul. 9, 2007).

Yusuke Ohwatari et al., "Investigation of Interference Rejection Combining Receiver to Suppress Inter-cell Interference in LTE-Advanced Downlink", IEICE Technical Report, vol. 111, No. 145, Jul. 14, 2011, pp. 31-36.

NTT Docomo, "Influence of Channel Estimation Error on MMSE-IRC Receiver", 3GPP TSG-RAN WG1 Meeting #65 R1-111639, May 3, 2011, pp. 1-10.

\* cited by examiner

Fig. 8  Table 7.4.1.1.2-3: PDSCH DM-RS positions $\bar{l}$ for single-symbol DM-RS.

| $l_d$ in symbols | DM-RS positions $\bar{l}$ ||||||||
|---|---|---|---|---|---|---|---|---|
| | PDSCH mapping type A |||| PDSCH mapping type B ||||
| | *dmrs-AdditionalPosition* |||| *dmrs-AdditionalPosition* ||||
| | 0 | 1 | 2 | 3 | 0 | 1 | 2 | 3 |
| 2 | - | - | - | - | $l_0$ | $l_0$ | | |
| 3 | $l_0$ | $l_0$ | $l_0$ | $l_0$ | - | - | | |
| 4 | $l_0$ | $l_0$ | $l_0$ | $l_0$ | $l_0$ | $l_0$ | | |
| 5 | $l_0$ | $l_0$ | $l_0$ | $l_0$ | - | - | | |
| 6 | $l_0$ | $l_0$ | $l_0$ | $l_0$ | $l_0$ | $l_0,4$ | | |
| 7 | $l_0$ | $l_0$ | $l_0$ | $l_0$ | $l_0$ | $l_0,4$ | | |
| 8 | $l_0$ | $l_0,7$ | $l_0,7$ | $l_0,7$ | - | - | | |
| 9 | $l_0$ | $l_0,7$ | $l_0,7$ | $l_0,7$ | - | - | | |
| 10 | $l_0$ | $l_0,9$ | $l_0,6,9$ | $l_0,6,9$ | - | - | | |
| 11 | $l_0$ | $l_0,9$ | $l_0,6,9$ | $l_0,6,9$ | - | - | | |
| 12 | $l_0$ | $l_0,l_1$ | $l_0,6,9$ | $l_0,5,8,11$ | - | - | | |
| 13 | $l_0$ | $l_0,l_1$ | $l_0,7,11$ | $l_0,5,8,11$ | - | - | | |
| 14 | $l_0$ | $l_0,l_1$ | $l_0,7,11$ | $l_0,5,8,11$ | - | - | | |

WIRELESS RECEIVING APPARATUS, WIRELESS COMMUNICATION SYSTEM, AND WIRELESS RECEIVING METHOD

This application is a National Stage Entry of PCT/JP2020/019049 filed on May 13, 2020, which claims priority from Japanese Patent Application 2019-126650 filed on Jul. 8, 2019, the contents of all of which are incorporated herein by reference, in their entirety.

TECHNICAL FIELD

The present disclosure relates to a wireless receiving apparatus, a wireless communication system, and a wireless receiving method.

BACKGROUND ART

In a cellular wireless communication system such as LTE (Long Term Evolution) and NR (New Radio/5G), a plurality of cellular phone base stations are installed to form communication areas. In the case where high-density installation of the base stations is promoted at a high rate of frequency re-utilization in order to increase the capacity of the system, there arises a problem of inter-cell interference. In the downlink, the user equipment at the cell edge is affected by the inter-cell interference from the neighboring base stations. On the other hand, in the uplink, the base station is affected by the interference from other user equipment that is performing transmission using the physical layer time/frequency resource that are the same. Therefore, an inter-ference suppression technology is now being studied.

As a method of suppressing interferences, MMSE-IRC (Minimum Mean Square Error Interference Rejection Combining: minimum mean square error method—interference rejection combining) is known. Related techniques are disclosed in Patent Literature 1 and Non-patent Literatures 1 and 2.

CITATION LIST

Patent Literature

Patent Literature 1: International Patent Publication No. WO2008/084800

Non-Patent Literature

Non-Patent Literature 1: Y. Ohwatari, N. Miki, T. Asai, T. Abe, and H. Taoka, "Performance of advanced receiver employing interference rejection combining to suppress inter-cell interference in LTE-Advanced downlink," in Proc. IEEE Vehi. Tech. Conf. (VTC Fall 2011), San Francisco, USA, September 2011, pp. 1-7.

Non-Patent Literature 2: M. K. Ozdemir and H. Arslan, "Channel estimation for wireless OFDM systems," Commun. Surveys Tuts., vol. 9, no. 2, pp. 18-48, Second Quarter 2007 (9 Jul. 2007).

SUMMARY OF INVENTION

Solution to Problem

In an MMSE-IRC receiving apparatus, a covariance matrix is obtained in consideration of an interference signal, and by using a weight vector based on the obtained covariance matrix, a transmission signal in which interferences are suppressed can be estimated. Further, in Non-Patent Literature 1, an offset value with a value in the diagonal elements of a matrix is added to the covariance matrix, thereby improving the transmission signal estimation accuracy. However, in the related techniques, there is a problem that it may be difficult to improve the transmission signal estimation accuracy.

The present disclosure has been made in view of the problem mentioned above, and an object thereof is to provide a wireless receiving apparatus, a wireless communication system, and a wireless receiving method, each adapted to further improve the transmission signal estimation accuracy.

Solution to Problem

A wireless receiving apparatus according to the present disclosure includes:
  a channel estimation unit configured to estimate a channel response vector based on a reception signal received via a plurality of antennas;
  a covariance matrix estimation unit configured to estimate a covariance matrix based on the reception signal and the channel response vector;
  a covariance matrix correction unit configured to correct the covariance matrix by adding, to the covariance matrix, an offset value with a value in components including off-diagonal elements of the matrix; and
  a weight multiplication unit configured to estimate a transmission signal by multiplying a weight based on the channel response vector and the corrected covariance matrix by the reception signal.

A wireless communication system according to the present disclosure includes a wireless transmitting apparatus and a wireless receiving apparatus, the wireless receiving apparatus including:
  a channel estimation unit configured to estimate a channel response vector based on a reception signal received from the wireless transmitting apparatus via a plurality of antennas;
  a covariance matrix estimation unit configured to estimate a covariance matrix based on the reception signal and the channel response vector;
  a covariance matrix correction unit configured to correct the covariance matrix by adding, to the covariance matrix, an offset value with a value in components including off-diagonal elements of the matrix; and
  a weight multiplication unit configured to estimate a transmission signal by multiplying a weight based on the channel response vector and the corrected covariance matrix by the reception signal.

A wireless communication method according to the present disclosure includes:
  estimating a channel response vector based on a reception signal received via a plurality of antennas;
  estimating a covariance matrix based on the reception signal and the channel response vector;
  correcting the covariance matrix by adding, to the covariance matrix, an offset value with a value in components including off-diagonal elements of the matrix; and
  estimating a transmission signal by multiplying a weight based on the channel response vector and the corrected covariance matrix by the reception signal.

Advantageous Effects of Invention

According to the present disclosure, it is possible to provide a wireless receiving apparatus, a wireless communication system, and a wireless receiving method, each adapted to further improve the transmission signal estimation accuracy.

DESCRIPTION OF EXAMPLE EMBODIMENT

Hereinbelow, example embodiments will be described with reference to the drawings. In each of the drawings, the same elements are denoted by the same reference symbols, and redundant descriptions are omitted as necessary.

Overview of Example Embodiment

First, for readily understanding of example embodiments, an overview of the example embodiments will be described.

Figure 1:
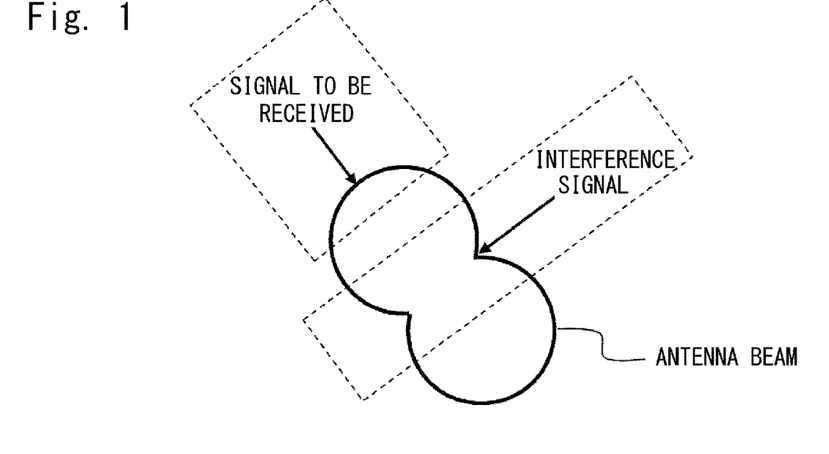
FIG. 1 is a diagram showing an example of formation of an antenna beam for explaining an overview of an example embodiment.

In a related MMSE-IRC receiving circuit (a receiving apparatus), a plurality of antennas are used to form a beam (an antenna beam) in consideration of an interference signal. Specifically, as shown in FIG. 1, by directing a beam toward an arrival direction of a signal to be received and not forming a beam (directing a null) in an arrival direction of an interference signal, it is attempted to suppress interferences thereby performing transmission of good quality. This is realized by obtaining a covariance matrix on which a weight vector is based such that an interference signal is suppressed in a receiving circuit.

Figure 2:
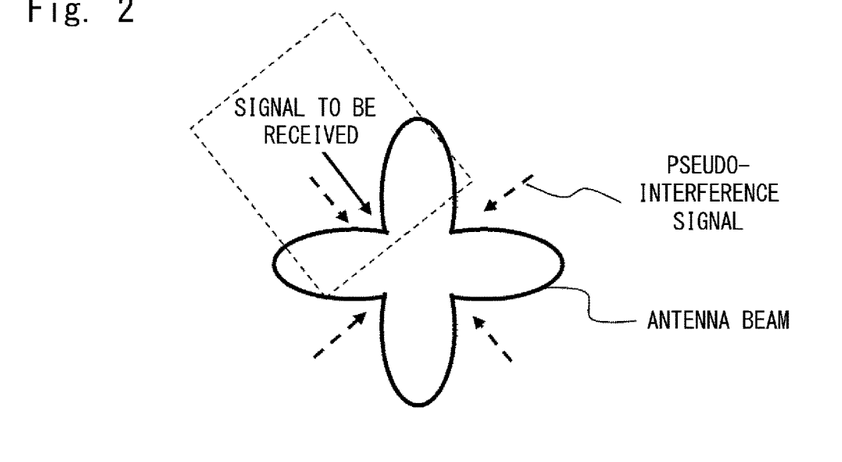
FIG. 2 is a diagram showing an example of formation of an antenna beam for explaining an overview of an example embodiment.

On the other hand, when an interference signal is hardly present, it is treated as if a pseudo-interference signal is present as shown in FIG. 2. That is, when there is hardly any interference signal, it is treated as if a pseudo-interference signal having an antenna correlation is present, and it is regarded as if a small interference signal is present.

As a result, a beam is formed such that the pseudo-interference signal is avoided as shown in FIG. 2. At this time, when the vector of the pseudo-interference signal and the vector of the signal to be received are close to each other, there arises a problem that a beam is not formed in the arrival direction of the signal to be received. That is, in the receiving circuit, since a covariance matrix is obtained such that the aforementioned pseudo-interference signal is suppressed, the reception quality may deteriorate.

Figure 3:
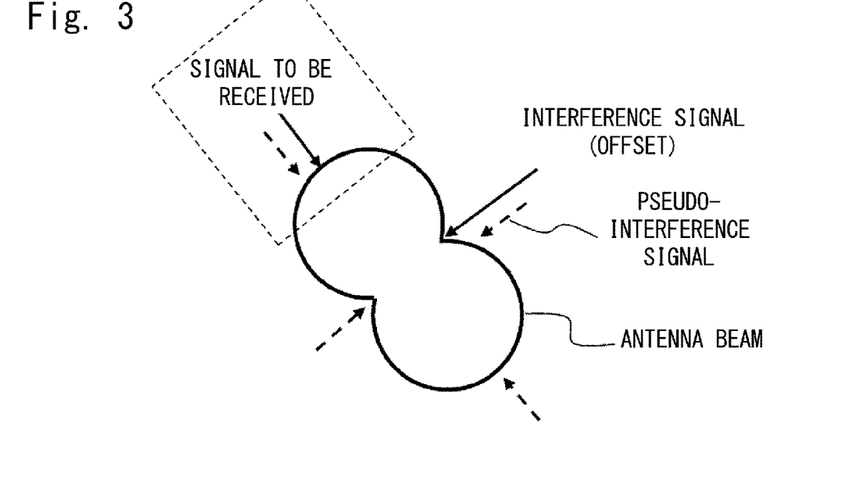
FIG. 3 is a diagram showing an example of formation of an antenna beam for explaining an overview of an example embodiment.

Therefore, in the example embodiments, as shown in FIG. 3, by intentionally adding (as an offset) a pseudo-interference signal having a vector different from that of the signal to be received, a beam that avoids only the pseudo-interference signal is formed. Specifically, as described later, in the receiving circuit, by adding, to the covariance matrix, an offset value with a value also in the off-diagonal elements of the covariance matrix, degradation in the reception quality is suppressed.

First Example Embodiment

Figure 4:
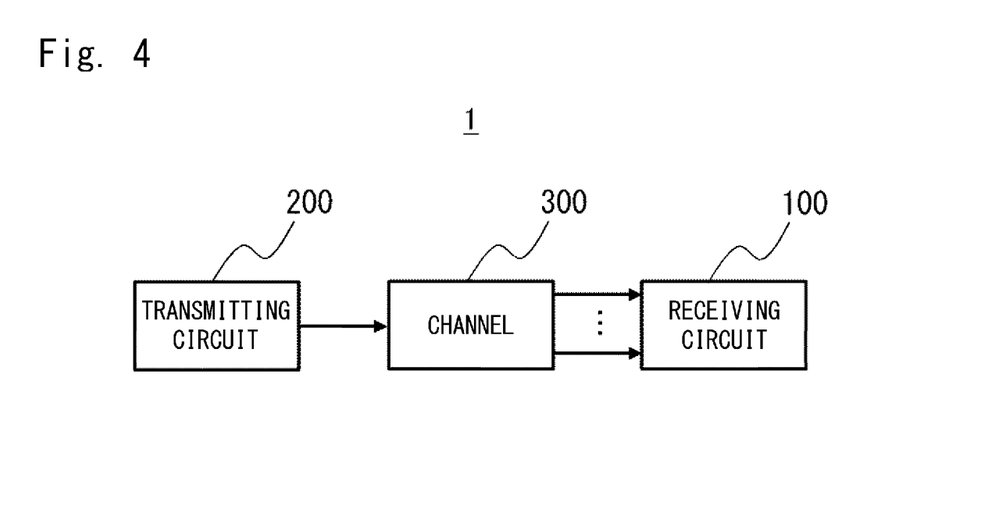
FIG. 4 is a configuration diagram showing a configuration example of a wireless communication system according to a first example embodiment.

Next, a first example embodiment will be described. FIG. 4 shows a configuration example of a wireless communication system according to a first example embodiment. As shown in FIG. 4, a wireless communication system 1 according to the first example embodiment is a cellular wireless communication system that performs MIMO (Multiple-Input and Multiple-Output) transmission such as LTE and NR, and includes a transmitting circuit 200 and a receiving circuit 100 that perform wireless communication with each other via a channel (a wireless channel) 300. The transmitting circuit 200 is a transmitting apparatus that transmits a wireless signal to the receiving circuit 100 via a plurality of antennas, and the receiving circuit 100 is a receiving apparatus that receives a wireless signal from the transmitting circuit 200 via a plurality of antennas. Either one of the transmitting circuit 200 or the receiving circuit 100 serves as a base station and the other one serves as a user equipment. That is, the channel 300 may be an uplink channel or a downlink channel. The receiving circuit 100 is an MMSE-IRC receiving circuit coupled with the transmitting circuit 200 via the channel 300.

<Related Receiving Circuit>

Figure 5:
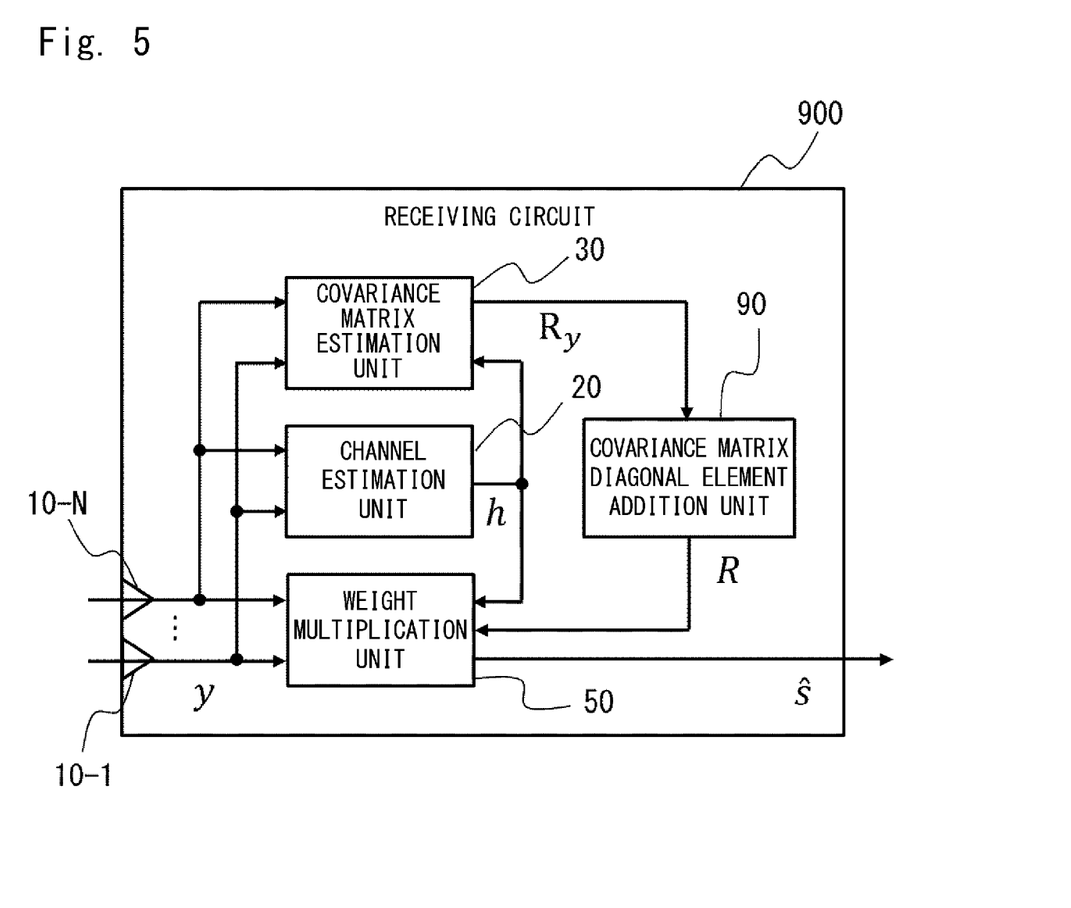
FIG. 5 is a configuration diagram showing a configuration example of a related receiving circuit.

Here, as a related technique of the receiving circuit 100 according to the first example embodiment, an MMSE-IRC receiving circuit disclosed in Non-Patent Literature 1 will be described. FIG. 5 shows a configuration of a receiving circuit 900 that is the related MMSE-IRC receiving circuit. As shown in FIG. 5, the receiving circuit 900 includes N-number of antennas 10-1 to 10-N, a channel estimation unit 20, a covariance matrix estimation unit 30, a covariance matrix diagonal element addition unit 90, and a weight multiplication unit 50.

Hereinbelow, an operation of the related receiving circuit 900 will be described using mathematical expressions. Here, a signal transmitted by the transmitting circuit 200 is denoted by s and an N-dimensional reception signal vector at which the transmission signal s is received by the antennas 10-1 to 10-N via the channel 300 is denoted by y. An N-dimensional channel response vector having, as an element thereof, an estimate value of the channel response between the transmitting circuit 200 and the antennas 10-1 to 10-N is denoted by h. At this time, a transmission signal estimation result ŝ of the receiving circuit 900 of the related technique (in the formulae, s with the mark "^" is written ŝ) is expressed by the following Expression (1).

[Formula 1]

$$\hat{s} = h^H R^{-1} y = Wy \quad (1)$$

Here, R denotes a covariance matrix and W denotes a weight vector.

The channel estimation unit 20 estimates the channel response vector h from the reception signal vector y. For instance, in an LTE uplink that adopts the OFDM (Orthogonal Frequency Division Multiplexing) system, a known reference signal $s_{RS}$ called a DM-RS symbol (Demodulation Reference Symbol) is transmitted from a user equipment at a constant rate, and by using the transmitted reference signal, channel estimation can be performed on the receiving circuit side. The channel estimation algorithm is described in detail in, for instance, Non-Patent Literature 2, and thus a detailed description thereof is omitted.

The covariance matrix estimation unit 30 estimates a covariance matrix $R_y$. The covariance matrix $R_y$ is calculated by, for instance, the following Expressions (2) and (3).

[Formula 2]

$$R_y = h^H h + E[\tilde{y}\tilde{y}^H] \quad (2)$$

[Formula 3]

$$\tilde{y} = y_{RS} - h s_{RS} \quad (3)$$

Here, $y_{RS}$ denotes a reception signal vector when the transmitting circuit 200 transmits the reference signal $s_{RS}$. E[ ] in the second term on the right-side of Expression (2) denotes averaging over the time—frequency resource at which the reference signal was received. The channel response vector h and the covariance matrix $R_y$ are estimate values, and it is known that due to the influence of deviation of these values from the ideal values, the estimation accuracy of the transmission signal estimation result s^ deteriorates. For mitigating such deterioration, a method called Diagonal Loading in which an offset value is added to the diagonal elements of the covariance matrix as shown in Expression (4) is known (see, Non-Patent Literature 1).

[Formula 4]

$$R = R_y + \alpha I \quad (4)$$

Here, I denotes a unit matrix in which the diagonal elements are 1 and the off-diagonal elements are 0. α is a coefficient of the diagonal elements.

The covariance matrix diagonal element addition unit 90 performs addition processing shown in the aforementioned Expression (4) on the covariance matrix $R_y$ input from the covariance matrix estimation unit 30. The weight multiplication unit 50 calculates the transmission signal estimation result s^ by generating a weight vector W and multiplying the generated weight vector W by the reception signal vector y in accordance with the aforementioned Expression (1) based on the channel response vector h and the covariance matrix R input from the channel estimation unit 20 and the covariance matrix diagonal element addition unit 90, respectively.

The reception quality in such a related receiving circuit 900 will now be examined. When the density of a reference signal is low relative to a data signal, the estimation accuracy of the channel response vector h and the covariance matrix R obtained as described above is lowered. If only the Additive white Gaussian noise (AWGN) is applied, statistically, the noise has no antenna correlation, and therefore an ideal covariance matrix R has non-zero values in only the diagonal elements. However, when the number of time—frequency resources of the reference signal used in the estimation is small, averaging cannot performed sufficiently, and the covariance matrix R has non-zero values in the off-diagonal elements. In this case, it is treated as if a pseudo-interference signal having an antenna correlation is present. As a result of generation of the weight vector such that the pseudo-interference signal is suppressed, the transmission signal estimation accuracy deteriorates. This tendency is conspicuous when there is a noise that does not have an antenna correlation that is large relative to the signal component.

As described above, in the related MMSE-IRC receiving circuit, estimation accuracy of the channel response vector and the covariance matrix is low, and there is a problem that the transmission signal estimation accuracy is low when the Additive white Gaussian noise that is large compared to the signal component is applied.

Receiving Circuit According to the First Example Embodiment

Figure 6:
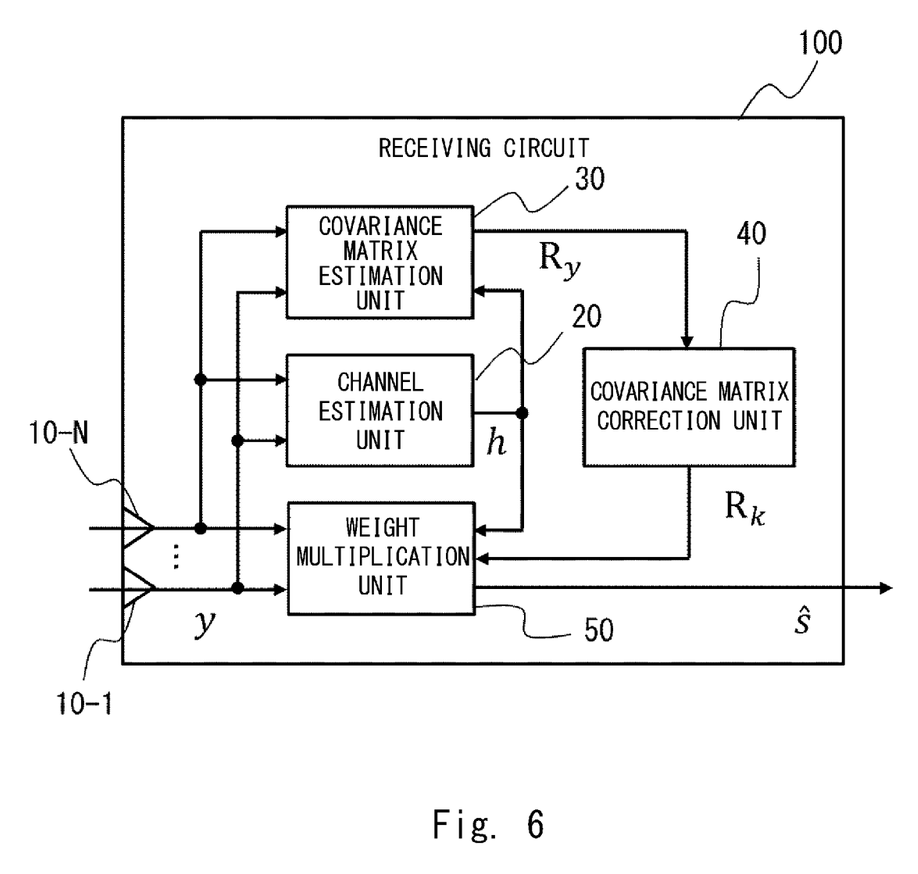
FIG. 6 is a configuration diagram showing a configuration example of a receiving circuit according to a first example embodiment.

FIG. 6 shows a configuration example of the receiving circuit 100 according to the first example embodiment. As shown FIG. 6, the receiving circuit 100 includes the N-number of antennas 10-1 to 10-N, the channel estimation unit 20, the covariance matrix estimation unit 30, a covariance matrix correction unit 40, and the weight multiplication unit 50. That is, the receiving circuit 100 includes, like the receiving circuit shown in FIG. 5, the N-number of antennas 10-1 to 10-N, the channel estimation unit 20, the covariance matrix estimation unit 30, and the weight multiplication unit 50, as well as the covariance matrix correction unit 40 in place of the covariance matrix diagonal element addition unit 90 of FIG. 5.

The covariance matrix correction unit 40 corrects the covariance matrix by adding, to the covariance matrix, an offset value with a value also in the off-diagonal elements of the covariance matrix. Accordingly, in the weight multiplication unit 50, calculation of the following Expression (5) is performed and the transmission signal estimation result s^ is obtained.

[Formula 5]

$$\hat{s} = h^H (R_y + \alpha I = R_{off})^{-1} y \quad (5)$$

Here, $R_{off}$ is a covariance matrix correction value having non-zero values in the off-diagonal elements. By the covariance matrix correction unit 40 and the calculation of Expression (5), the problem of the aforementioned related receiving circuit 900 is solved, whereby it is possible to improve the transmission signal estimation accuracy even when the estimation accuracy of the channel response vector and the covariance matrix are low and the Additive white Gaussian noise that is large with respect to the signal component is applied.

That is, it is necessary to estimate the covariance matrix of the reception signal in the MMSE-IRC algorithm. When the AWGN level is high relative to the signal level, the estimation accuracy of the covariance matrix drops. Although statistically, AWGN has no antenna correlation, a random antenna correlation remains when the number of the covariance matrix estimation samples is small. Such a residual random antenna correlation appears to be a pseudo interference of various levels in various arrival directions in the MMSE-IRC algorithm. In the related receiving circuit, a weight is generated such that the pseudo interference is suppressed unnecessarily, thus causing deterioration of the reception characteristics.

Therefore, in the first example embodiment, a clean interference that arrives virtually from one direction is assumed, and a covariance matrix corresponding thereto is added to an estimated covariance matrix to thereby perform correction. Accordingly, the sensitivity to the pseudo interference in the aforementioned related receiving circuit is lowered, whereby the reception characteristics are improved. This takes the advantage of the fact that the MMSE-IRC receiving circuit can suppress the interference in just one direction even if the level thereof is high whereas it is difficult to suppress the interferences in various directions.

Figure 7:
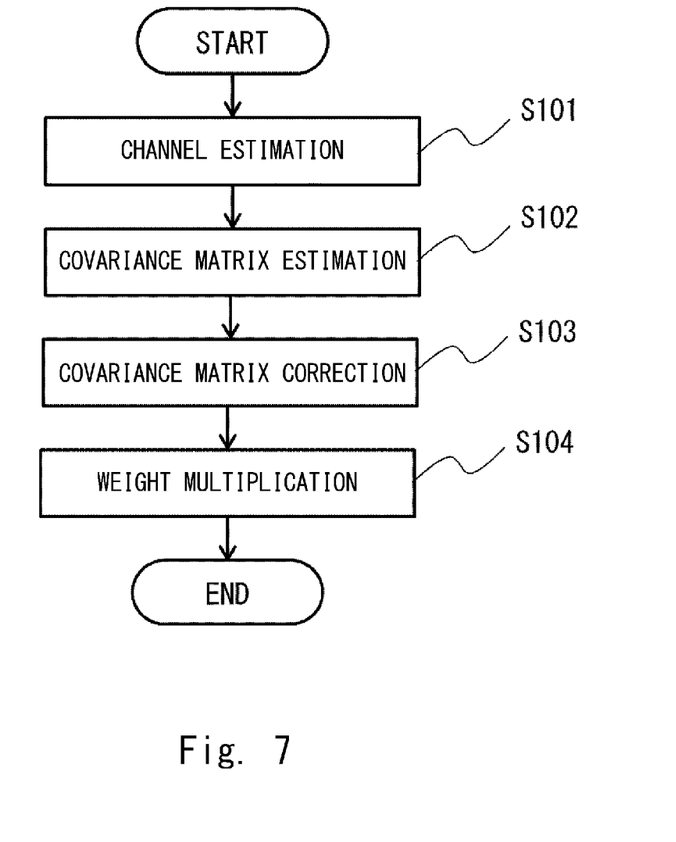
FIG. 7 is a flowchart showing an operation example of the receiving circuit according to the first example embodiment.

Next, an operation (a receiving method) of the receiving circuit 100 according to the first example embodiment will be described with reference to the flowchart shown in FIG. 7. Herein, the operation of the receiving circuit 100 will be described using an LTE uplink as an example. The LTE uplink has a frame configuration (called a slot) configured of 6 to 7 OFDM symbols, and each OFDM symbol is configured of the maximum of 100 Resource Blocks (RB) in each of which 12 subcarriers are put together. The user equipment is allocated a bandwidth on the RB basis. A known reference signal for one symbol called a DM-RS symbol is present in one slot. In the first example embodiment, user allocation is performed for 1RB that is the minimum unit, and channel estimation is performed on the subcarrier basis and the covariance matrix is estimated on the RB basis. Further, the number of antennas is four.

Further, the channel estimation unit 20 estimates the channel response vector $h_k$ (k=1, . . . 12) from the reception signal vector $y_{RS,k}$ (k=1, . . . 12) of the DMRS symbol (S101). Here, k is a subcarrier index. Note as described above, Non-Patent Literature 2 discloses a plurality of channel estimation algorithms and thus detailed descriptions thereof are omitted.

Next, the covariance matrix estimation unit 30 estimates the covariance matrix $R_y$ (S102). The covariance matrix $R_y$ is calculated by, for instance, the following Expressions (6) and (7).

[Formula 6]

$$R_{y,k} = h_k^H h_k + \frac{1}{12}\sum_{k=1}^{12} \tilde{y}_k^H \tilde{y}_k \quad (6)$$

[Formula 7]

$$\tilde{y}_k = y_{RS,k} - h_k s_{RS,k} \quad (7)$$

Here, $s_{RS,k}$ denotes the transmission reference signal of the subcarrier index k. Since the covariance matrix $R_{y,k}$ is the average for 12 subcarriers, which is a small number, the instantaneous antenna correlation component of AWGN is reflected in the covariance matrix.

Next, the covariance matrix correction unit 40 performs the correction shown in the following Expression (8) (S103). Further, the weight multiplication unit 50 calculates the transmission signal estimation result ŝ by generating a weight vector W and multiplying the generated weight vector W by the reception signal vector y in accordance with the aforementioned Expression (5) (S104).

[Formula 8]

$$R_{k+}R_{y,k}+\alpha I+R_{oft} \quad (8)$$

In Expression (5) and Expression (8), "αI" denotes the same offset as that of the related receiving apparatus 900. This value is not necessarily required in the present example embodiment, however, it may be added as necessary for implementing the first example embodiment.

A corrected covariance matrix component $R_{oft}$ is a covariance matrix component in the case where there is an interference in the specific arrival direction. $R_{oft}$ can be obtained from the following Expressions (9) and (10) in which the assumed reception signal vector from the interference source is denoted by r.

[Formula 9]

$$R_{oft}=r^H r \quad (9)$$

[Formula 10]

$$r=\beta J \quad (10)$$

Here, β denotes a level correction coefficient and J denotes a correction vector. The correction vector J can be, for instance, those shown in the following Expressions (11) and (12).

[Formula 11]

$$r=\beta[1\ 1\ 1\ 1] \quad (11)$$

[Formula 12]

$$r=\beta[1\ 0\ 1\ 0] \quad (12)$$

It is desirable to set the correction vector J in the assumed interference source reception signal vector in accordance with the configuration of the antennas and the like. From the shape of the antennas, it is possible to know the direction in which there is no possibility of a signal arriving (least likely to arrive), and therefore the known direction that is vector-represented may be referred to as the corrected vector J. For instance, when the antennas have such a shape that the possibility of signals arriving at each of the antennas at the same phase and the same level is low, the correction vector J is expressed by [1111] as shown in Expression (11), and when the antennas have such a shape that the possibility of the level of one of the adjacent antennas being lowered extremely is low, the correction vector J is expressed by [1010] as shown in Expression (12).

As described above, in the first example embodiment, the estimation accuracy of the channel response vector and the covariance matrix is low, and even in the case where the Additive white Gaussian noise that is large compared to the signal component is applied, there is an effect in which the transmission signal estimation accuracy is enhanced.

That is, since there is no antenna correlation in the case where the Additive white Gaussian noise (AWGN) is applied, the off-diagonal element contribution of the covariance matrix becomes statistically 0. However, when the number of time—frequency resources used in the covariance matrix estimation is small, the instantaneous antenna correlation component of AWGN is reflected in the off-diagonal elements of the covariance matrix. Since the instantaneous antenna correlation component of AWGN is random, it is treated as if a plurality of interferences in various arrival directions and of various levels are input in a pseudo manner. As a result of generation of the weight vector such that these plurality of pseudo interferences are suppressed, the transmission signal estimation accuracy is lowered. On the other hand, if there are a sufficient number of antennas, it is possible to suppress the interference signals concentrated in the specific arrival direction with hardly any effect on the transmission signal estimation accuracy. Therefore, in the first example embodiment, it is assumed that an interference of a certain level is present in the specific arrival direction, and the covariance matrix component $R_{oft}$ corresponding thereto is added intentionally to the covariance matrix. Accordingly, the suppression effect of the pseudo interferences due to the instantaneous antenna correlation component of AWGN is lowered. As a result, the transmission signal estimation accuracy is improved in the case where the estimation accuracy of the channel response vector and the covariance matrix is low and the AWGN that is large compared to the signal component is applied.

Here, the conditions by which the effects of the first example embodiment are achieved will be examined. There are two conditions: the first condition is that "the density of the reference signal is low relative to the data signal"; and the second condition is that "the SNR is equal to or lower than the predetermined value".

First of all, the first condition is different between LTE and NR. In LTE, the reference signal is bound to enter two points (for two symbols) in one subframe (14 symbols) and "the density of the reference signal with respect to the data signal" is determined to be 2/14, whereby the first condition is always met.

Figure 8:
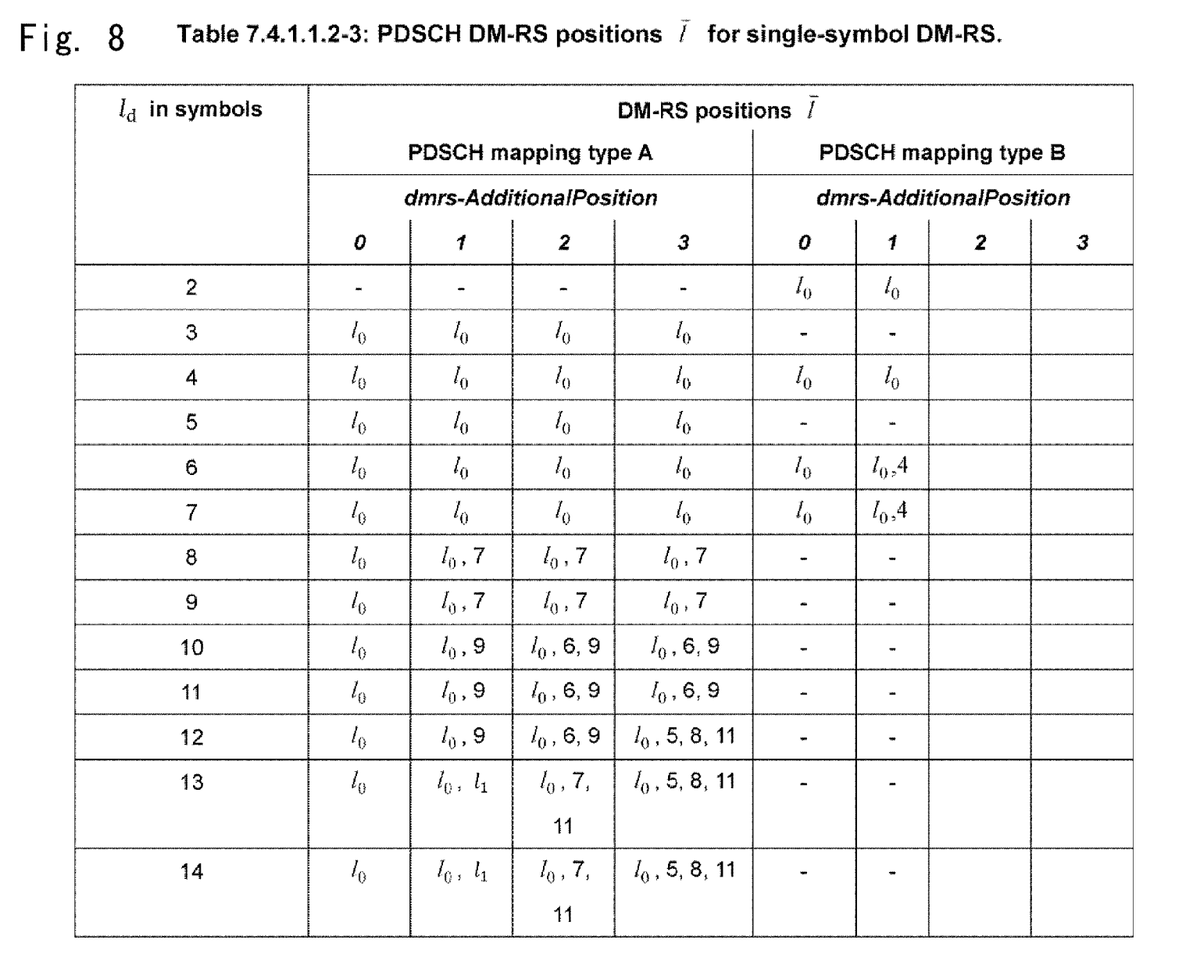
FIG. 8 is a diagram showing an example of mapping of a reception signal according to the first example embodiment.

On the other hand, in NR, since the reference signal is thinned out in the frequency axis direction, "the density of the reference signal with respect to the data signal" can vary depending on the degree of thinning-out. Therefore, it is necessary to satisfy the aforementioned first condition in NR. Note that the "degree of thinning-out" in NR is determined based on the Configuration. For example, this degree is determined based on the "density" IE of CSI-RS-ResourceMapping specified in 3GPP TS38.331. However, in the case of CSI-RS, the degree of thinning-out is controlled by the density, but CSI-RS is only in the downlink (DL). On the other hand, DMRS is in both the downlink (DL) and the uplink (UL). For instance, the proportion of DL DMRS is specified in Table 7.4.1.1.2-3: PDSCH DM-RS positions 1 for single-symbol DM-RS of 3GPP TS38.211, an excerpt of which is shown in FIG. 8. In the example of FIG. 8, the positions of DM-RS differ depending on the PDSCH Mapping Type.

Next, regarding the aforementioned second condition, as a result of the simulation, it was found that when SNR is equal to or larger than the predetermined value, the reception quality was good in the case where the offset ($R_{oft}$) introduced in the first example embodiment is not included (or the value is brought to zero) when SNR is equal to or higher than the predetermined value. Note that this condition is common to both LTE and NR. Therefore, when SNR is equal to or greater than the predetermined value, it is desirable to set β to zero or not to perform n-addition itself of $R_{oft}$ in the aforementioned Expression (10). Further, when SNR is brought to a value equal to or lower than the predetermined value and β is brought to a non-zero value, it is desirable to set these values so as to be equivalent to (i.e. about the same as) the noise level.

Figure 9:
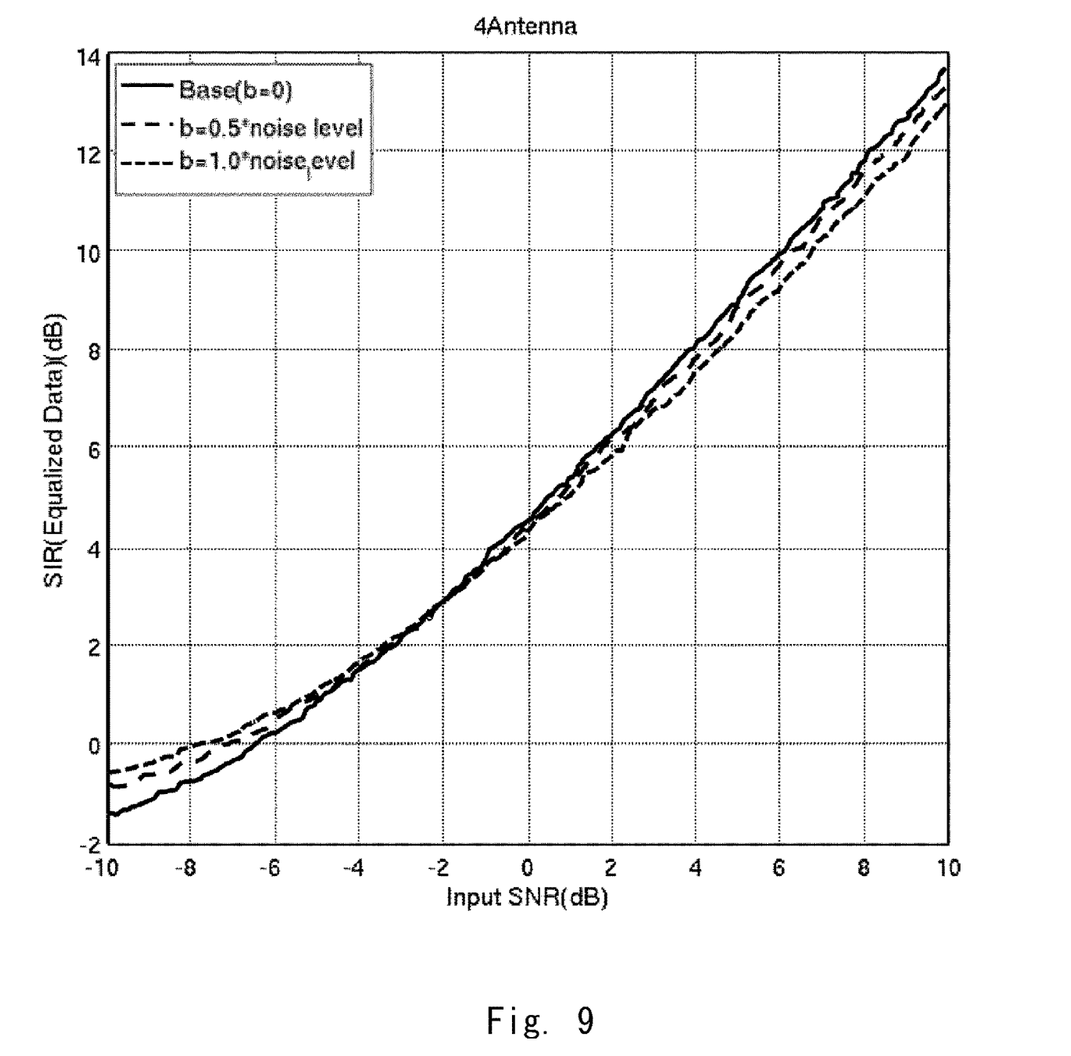
FIG. 9 is a diagram showing an example of a simulation result of the receiving circuit according to the first example embodiment.

FIG. 9 shows an example of a simulation result of the receiving circuit according to the first example embodiment. FIG. 9 is a result of a simple simulation and the simulation conditions are as shown below.

Frame configuration: LTE Uplink PUSCH
 Number of antennas: Four receiving antennas
 Cannel: AWGN channel (4-pass delay model)
 Channel estimation method: Two-dimensional polynomial approximation
 User allocation PRB number: 1

As shown in FIG. 9, in the relationship of SNR (signal to noise ratio)—SIR (signal to interference ratio), in the case where SNR is large, SIR is large when the noise level is low (the higher the noise level, the smaller SIR is), and in the case where SNR is small, SIR is large when the noise level large (the smaller the noise level, the smaller SIR is).

Second Example Embodiment

Figure 10:
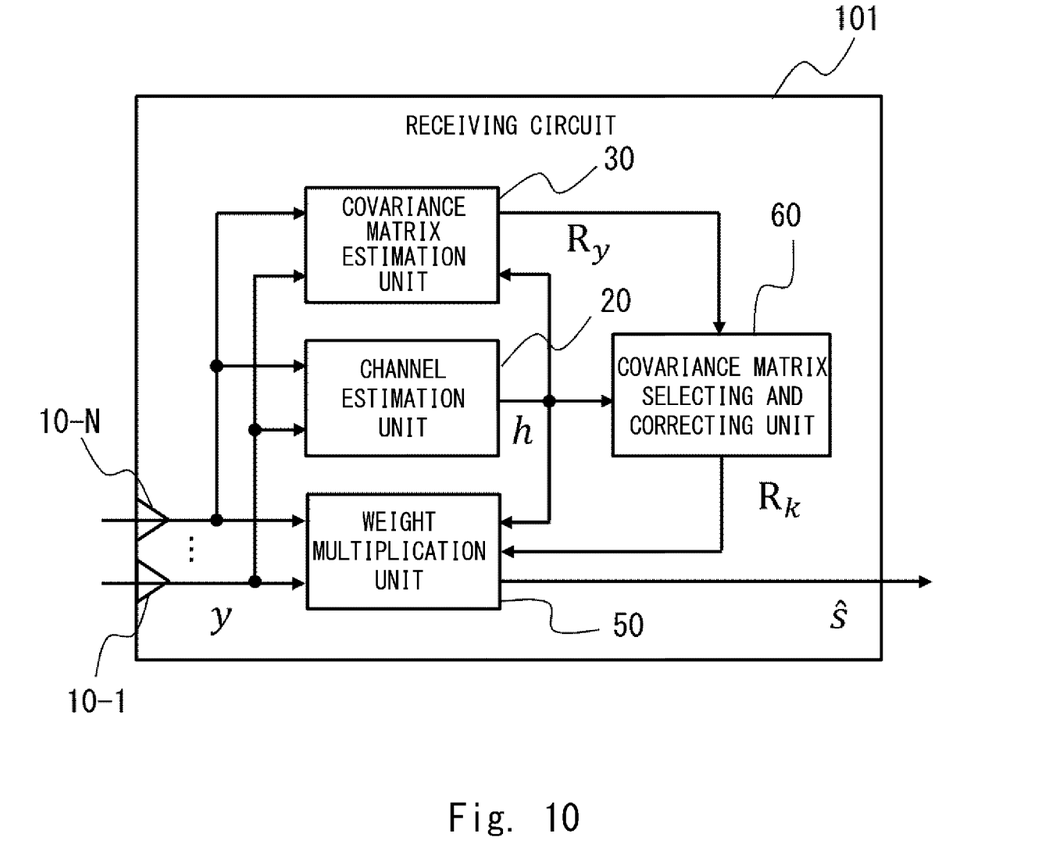
FIG. 10 is a configuration diagram showing a configuration example of a receiving circuit according to a second example embodiment.

Next, a second example embodiment will be described. FIG. 10 shows a configuration example of a receiving circuit 101 according to the second example embodiment. As shown in the figure, the receiving circuit 101 includes a covariance matrix selecting and correcting unit 60 in place of the covariance matrix correction unit 40 compared to the receiving circuit 100 of the first example embodiment shown in FIG. 6. Other configurations are the same as those of the first example embodiment.

In the first example embodiment, when the correlation between the assumed interference source reception signal vector r corresponding to the correction covariance matrix component $R_{oft}$ used in the covariance matrix correction unit 40 and a receiving vector of the desired signal component is high, in other words, when the arrival directions of the desired signal and the assumed interference signal are close to each other, the transmission signal estimation accuracy deteriorates. Therefore, in the second example embodiment, a plurality of assumed interference source reception signal vector $r_m$ (m=1, . . . , M) are prepared. Here, M denotes the number of assumed interference source reception signal vectors. The covariance matrix selecting and correcting unit 60 takes the inner product of the channel response vector and the assumed interference source reception signal vector and selects the corrected covariance matrix component $R_{oft}$ corresponding to the assumed interference source reception signal vector having the minimum inner product to thereby correct the covariance matrix. For instance, when M=2, the assumed interference source reception signal vector can be obtained from the following Expressions (13) and (14). For instance, a plurality of candidate vectors for the assumed interference source reception signal vector may be any vector as long as the candidate vectors are orthogonal to each other.

[Formula 13]

$$r_1 = \beta[1\ 1\ 1\ 1] \tag{13}$$

[Formula 14]

$$r_2 = \beta[1\ -1\ 1\ -1] \tag{14}$$

As described above, by preparing a plurality of assumed interference source reception signal vector r, selecting the optimal interference source reception signal vector r, and correcting the covariance matrix, it is possible to reliably improve the transmission signal estimation accuracy.

Note that the present disclosure is not limited to the aforementioned example embodiments and can be changed as appropriate without departing from the gist of the present disclosure. For instance, the aforementioned example embodiments can be applied to receiving circuits in general that use the MMSE-IRC algorithms. That is, the present disclosure can be implemented in both the uplink and the downlink, and can be implemented in both the user equipment and the base station.

The whole or part of the example embodiments disclosed above can be described as, but not limited to, the following supplementary notes.

(Supplementary Note 1)
A wireless receiving apparatus comprising:
a channel estimation unit configured to estimate a channel response vector based on a reception signal received via a plurality of antennas;
a covariance matrix estimation unit configured to estimate a covariance matrix based on the reception signal and the channel response vector;
a covariance matrix correction unit configured to correct the covariance matrix by adding, to the covariance matrix, an offset value with a value in components including off-diagonal elements of the matrix; and
a weight multiplication unit configured to estimate a transmission signal by multiplying a weight based on the channel response vector and the corrected covariance matrix by the reception signal.

(Supplementary Note 2)
The wireless receiving apparatus described in Supplementary note 1, wherein the covariance matrix correction unit obtains the offset value $R_{off}$ by the following Expressions (15) and (16):

[Formula 15]

$$R_{off} = r^H r \quad (15)$$

wherein r denotes an assumed interference source reception signal vector and is expressed by the following Expression (16):

[Formula 16]

$$r = \beta J \quad (16)$$

wherein β denotes a level correction coefficient and J denotes a correction vector.

(Supplementary Note 3)
The wireless receiving apparatus described in Supplementary 2, wherein the covariance matrix correction unit sets the level correction coefficient to zero when SNR of the reception signal is larger than a predetermined value.

(Supplementary Note 4)
The wireless receiving apparatus described in Supplementary Note 2, wherein the covariance matrix correction unit sets the level correction coefficient to a value equivalent to a noise level of the reception signal when SNR of the reception signal is smaller than a predetermined value.

(Supplementary Note 5)
The wireless receiving apparatus described in any one of Supplementary Notes 2 to 4, wherein the covariance matrix correction unit sets the correction vector in accordance with a configuration of the plurality of antennas.

(Supplementary Note 6)
The wireless receiving apparatus described in Supplementary Note 5, wherein the covariance matrix correction means sets the correction vector to the plurality of antennas in accordance with the direction in which there is no possibility of a signal arriving.

(Supplementary Note 7)
The wireless receiving apparatus described in any one of Supplementary Notes 2 to 6, wherein the covariance matrix correction means prepares a plurality of the assumed interference source reception signal vector in advance and obtains the offset value using the assumed interference source reception signal vector having the minimum inner product with the channel response vector among the plurality of the assumed interference source reception signal vector.

(Supplementary Note 8)
The wireless receiving apparatus described in Supplementary Note 7, wherein the plurality of assumed interference source reception signal vectors are orthogonal to each other.

(Supplementary Note 9)
A wireless communication system comprising a wireless transmitting apparatus and a wireless receiving apparatus, the wireless receiving apparatus including:
a channel estimation unit configured to estimate a channel response vector based on a reception signal received from the wireless transmitting apparatus via a plurality of antennas;
a covariance matrix estimation unit configured to estimate a covariance matrix based on the reception signal and the channel response vector;
a covariance matrix correction unit configured to correct the covariance matrix by adding, to the covariance matrix, an offset value with a value in components including off-diagonal elements of the matrix; and
a weight multiplication unit configured to estimate a transmission signal by multiplying a weight based on the channel response vector and the corrected covariance matrix by the reception signal.

(Supplementary Note 10)
The wireless communication system described in Supplementary Note 9, wherein the covariance matrix correction unit obtains the offset value $R_{off}$ by the aforementioned Expressions (15) and (16):

(Supplementary Note 11)
A wireless communication method comprising:
estimating a channel response vector based on a reception signal received via a plurality of antennas;
estimating a covariance matrix based on the reception signal and the channel response vector;
correcting the covariance matrix by adding, to the covariance matrix, an offset value with a value in components including off-diagonal elements of the matrix; and
estimating a transmission signal by multiplying a weight based on the channel response vector and the corrected covariance matrix by the reception signal.

(Supplementary Note 12)
The wireless communication method described in Supplementary Note 11, wherein in the covariance matrix correction unit obtains the offset value $R_{off}$ by the aforementioned Expressions (15) and (16).

Although the present disclosure has been described with reference to the example embodiments, the present disclosure is not limited to the above. The configurations and details of the present disclosure can be modified in various ways that can be understood by those skilled in the art within the scope of the disclosure.

This application is based upon and claims the benefit of priority from Japanese patent application No. 2019-126650, filed on Jul. 8, 2019, the disclosure of which is incorporated herein in its entirety by reference.

REFERENCE SIGNS LIST

1 WIRELESS COMMUNICATION SYSTEM
10 ANTENNA
20 CHANNEL ESTIMATION UNIT
30 COVARIANCE MATRIX ESTIMATION UNIT
40 COVARIANCE MATRIX CORRECTION UNIT
50 WEIGHT MULTIPLICATION UNIT
60 COVARIANCE MATRIX SELECTING AND CORRECTING UNIT

90 COVARIANCE MATRIX DIAGONAL ELEMENT ADDITION UNIT
100, 101, 900 RECEIVING CIRCUIT
200 TRANSMITTING CIRCUIT
300 CHANNEL

What is claimed is:

1. A wireless receiving apparatus comprising:
a receiving circuit configured to:
   estimate a channel response vector based on a reception signal received via a plurality of antennas;
   estimate a covariance matrix based on the reception signal and the channel response vector;
   correct the covariance matrix by adding an offset value, to components of the covariance matrix including off-diagonal elements of the matrix; and
   estimate a transmission signal by multiplying a weight based on the channel response vector and the corrected covariance matrix by the reception signal,
wherein the offset value ($R_{off}$) is calculated by:

$$R_{off}=r^H r \quad (1)$$

wherein H denotes conjugate transpose or Hermitian transpose, and r denotes an assumed interference source reception signal vector and is expressed by:

$$r=\beta J \quad (2)$$

wherein β denotes a level correction coefficient and J denotes a correction vector.

2. The wireless receiving apparatus according to claim 1, wherein the level correction coefficient is set to zero when a signal to noise ratio (SNR) of the reception signal is larger than a predetermined value.

3. The wireless receiving apparatus according to claim 1, wherein the level correction coefficient is set to a value equivalent to a noise level of the reception signal when a signal to noise ratio (SNR) of the reception signal is smaller than a predetermined value.

4. The wireless receiving apparatus according to claim 1, wherein the correction vector is set in accordance with a configuration of the plurality of antennas.

5. The wireless receiving apparatus according to claim 4, wherein the correction vector is applied to the plurality of antennas in accordance with a direction in which there is no possibility of a signal arriving.

6. The wireless receiving apparatus according to claim 1, wherein a plurality of the assumed interference source reception signal vector are set in advance and the offset value is obtained using the assumed interference source reception signal vector having a minimum inner product with the channel response vector among the plurality of the assumed interference source reception signal vector.

7. The wireless receiving apparatus according to claim 6, wherein the plurality of assumed interference source reception signal vectors are orthogonal to each other.

8. A wireless communication system comprising a wireless transmitting apparatus and a wireless receiving apparatus, the wireless receiving apparatus comprising:
a receiving circuit configured to:
   estimate a channel response vector based on a reception signal received via a plurality of antennas;
   estimate a covariance matrix based on the reception signal and the channel response vector;
   correct the covariance matrix by adding an offset value, to components of the covariance matrix including off-diagonal elements of the matrix; and
   estimate a transmission signal by multiplying a weight based on the channel response vector and the corrected covariance matrix by the reception signal,
wherein the offset value ($R_{off}$) is calculated by:

$$R_{off}=r^H r \quad (1)$$

wherein H denotes conjugate transpose or Hermitian transpose, and r denotes an assumed interference source reception signal vector and is expressed by:

$$r=\beta J \quad (2)$$

wherein β denotes a level correction coefficient and J denotes a correction vector.

9. A wireless communication method comprising:
estimating, by a receiving circuit, a channel response vector based on a reception signal received via a plurality of antennas;
estimating, by the receiving circuit, a covariance matrix based on the reception signal and the channel response vector;
correcting, by the receiving circuit, the covariance matrix by adding an offset value, to components of the covariance matrix including off-diagonal elements of the matrix; and
estimating, by the receiving circuit, a transmission signal by multiplying a weight based on the channel response vector and the corrected covariance matrix by the reception signal,
wherein the offset value ($R_{off}$) is calculated by:

$$R_{off}=r^H r \quad (1)$$

wherein H denotes conjugate transpose or Hermitian transpose, and r denotes an assumed interference source reception signal vector and is expressed by:

$$r=\beta J \quad (2)$$

wherein β denotes a level correction coefficient and J denotes a correction vector.

* * * * *